(12) United States Patent
Yonemura et al.

(10) Patent No.: US 11,400,936 B2
(45) Date of Patent: Aug. 2, 2022

(54) TRAVEL ASSISTANCE DEVICE

(71) Applicants: JTEKT CORPORATION, Osaka (JP); HINO MOTORS, LTD., Hino (JP)

(72) Inventors: Syuuichi Yonemura, Kariya (JP); Masayoshi Takeda, Kariya (JP); Hirokazu Okuyama, Hino (JP); Hirofumi Yasui, Hino (JP); Naoshi Ichinose, Hino (JP); Nobuhiko Kojima, Hino (JP); Tomonari Yamakawa, Hoi-gun (JP); Sadahiro Kawahara, Kashihara (JP)

(73) Assignees: JTEKT CORPORATION, Osaka (JP); HINO MOTORS, LTD., Hino (JP)

( * ) Notice: Subject to any disclaimer, the term of this patent is extended or adjusted under 35 U.S.C. 154(b) by 0 days.

(21) Appl. No.: 17/049,604

(22) PCT Filed: Apr. 25, 2019

(86) PCT No.: PCT/JP2019/017736
§ 371 (c)(1),
(2) Date: Oct. 22, 2020

(87) PCT Pub. No.: WO2019/208717
PCT Pub. Date: Oct. 31, 2019

(65) Prior Publication Data
US 2021/0245759 A1 Aug. 12, 2021

(30) Foreign Application Priority Data
Apr. 26, 2018 (JP) .............................. JP2018-085862

(51) Int. Cl.
*B60W 10/20* (2006.01)
*B60W 30/165* (2020.01)
(Continued)

(52) U.S. Cl.
CPC ...... *B60W 30/18163* (2013.01); *B60W 10/20* (2013.01); *B60W 30/165* (2013.01);
(Continued)

(58) Field of Classification Search
CPC ........... B60W 30/18163; B60W 10/20; B60W 30/165; B60W 50/00; B60W 2050/0075;
(Continued)

(56) References Cited

U.S. PATENT DOCUMENTS 5,680,122 A 10/1997 Mio
6,128,559 A 10/2000 Saitou et al.
(Continued)

FOREIGN PATENT DOCUMENTS

CN 107406077 A 11/2017
EP 3091520 A1 11/2016
(Continued)

OTHER PUBLICATIONS

Jul. 16, 2019 International Search Report issued in International Patent Application No. PCT/JP2019/017736.
(Continued)

*Primary Examiner* — Peter D Nolan
*Assistant Examiner* — Ashley L Redhead, Jr.
(74) *Attorney, Agent, or Firm* — Oliff PLC

(57) ABSTRACT

A travel assistance device configured to execute travel assistance when a plurality of vehicles form a vehicle group and travel in a line. The travel assistance device includes: a first control unit configured to, if there is lane-change instruction for the vehicle group, cause an end-of-line vehicle to change lanes, such vehicle being the vehicle from among the plurality of vehicles forming the vehicle group that is positioned at the end of the line; and a second control unit configured to, following the lane change of the end-of-line vehicle, allow a lane change for at least one vehicle that
(Continued)

is other than the end-of-line vehicle and that is one of the vehicles forming the vehicle group.

7 Claims, 10 Drawing Sheets

(51) Int. Cl.
*B60W 50/00* (2006.01)
*B60W 30/18* (2012.01)

(52) U.S. Cl.
CPC ..... *B60W 50/00* (2013.01); *B60W 2050/0075* (2013.01); *B60W 2554/802* (2020.02); *B60W 2556/50* (2020.02); *B60W 2556/65* (2020.02)

(58) Field of Classification Search
CPC ....... B60W 2554/802; B60W 2556/50; B60W 2556/65; G05D 2201/0213; G05D 1/0293; G08G 1/167; G08G 1/22
See application file for complete search history.

(56) References Cited

U.S. PATENT DOCUMENTS

| | | | |
|---|---|---|---|
| 2013/0124012 A1 | 5/2013 | Shida et al. | |
| 2016/0071418 A1 | 3/2016 | Oshida et al. | |
| 2017/0011633 A1* | 1/2017 | Boegel | B60W 30/18163 |
| 2017/0066444 A1 | 3/2017 | Habu | |
| 2018/0137763 A1 | 5/2018 | Rden et al. | |

FOREIGN PATENT DOCUMENTS

| | | |
|---|---|---|
| JP | H09-81899 A | 3/1997 |
| JP | H10-96626 A | 4/1998 |
| JP | H10-307997 A | 11/1998 |
| JP | H11-20499 A | 1/1999 |
| JP | 2000-113400 A | 4/2000 |
| JP | 2007-196809 A | 8/2007 |
| JP | 2009-18623 A | 1/2009 |
| JP | 2012-030666 A | 2/2012 |
| WO | 2015/047181 A1 | 4/2015 |

OTHER PUBLICATIONS

Dec. 16, 2021 Partial European Search Report issued in European Patent Application No. 19792238.8.
Apr. 8, 2022 Search Report issued in European Patent Application No. 19843182.7.
Apr. 8, 2022 Office Action issued in Chinese Patent Application No. 201980049631.3.
Apr. 18, 2022 Office Action issued in U.S. Appl. No. 17/049,060.

\* cited by examiner

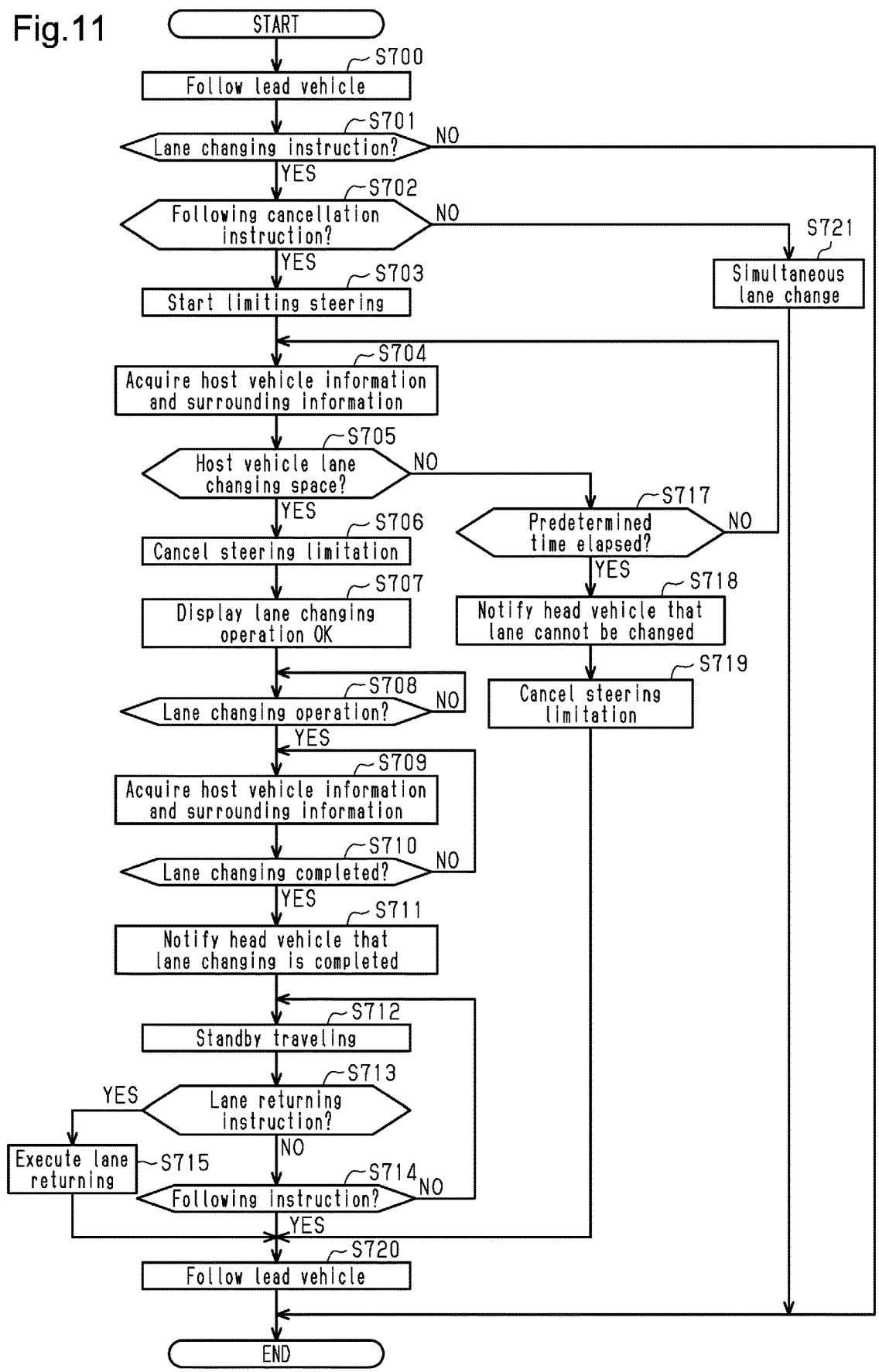

TRAVEL ASSISTANCE DEVICE

TECHNICAL FIELD

The present disclosure relates to a travel assistance device that assists the traveling of a vehicle capable of executing platooning.

BACKGROUND ART

In typical platooning, vehicles form a vehicle group to travel in a platoon. For example, each of the vehicles other than the head vehicle is controlled such that each vehicle follows its lead vehicle. Lane changing in a vehicle group during platooning moves the vehicle group, of which the entire length is long, such that the vehicle group keeps the platoon, and is thus more difficult than lane changing in a vehicle that travels individually. A technique for smoothly changing the lane of a vehicle group during platooning is described, for example, in Patent Document 1. More specifically, when an external means of the vehicle group is used to confirm that the space where the vehicle group can move exists in the destination lane, the lane of the vehicle group is changed and the vehicles surrounding the vehicle group are notified of the lane changing.

PRIOR ART DOCUMENTS

Patent Documents

Patent Document 1: Japanese Laid-Open Patent Publication No. 10-307997

SUMMARY OF THE INVENTION

Problems that the Invention is to Solve

In order to quickly change the lane of the entire vehicle group, the space where the entire vehicle group can move needs to be ensured in the destination lane from the beginning to the end of the lane changing. After confirming that the destination lane includes the space where the vehicle group can move, the technique of Patent Document 1 just notifies the surrounding vehicles of the lane changing and expects cooperation of the surrounding vehicles. Thus, the space where the vehicle group can move may not be able to be ensured until the end of the lane changing. This may delay the vehicle changing.

Accordingly, the present disclosure provides a travel assistance device that assists lane changing of a vehicle group during platooning.

Means for Solving the Problems

An aspect of the present disclosure provides a travel assistance device configured to execute a travel assistance for platooning of vehicles that form a vehicle group. The travel assistance device includes a first control unit configured to execute lane changing of a rearmost vehicle when a lane changing instruction for the vehicle group has been issued, the rearmost vehicle being a vehicle located at a rearmost part of the vehicles that form the vehicle group, and a second control unit configured to permit lane changing of at least one vehicle that forms the vehicle group other than the rearmost vehicle after executing the lane changing of the rearmost vehicle.

An aspect of the present disclosure provides a travel assistance device configured to execute a travel assistance for platooning of vehicles that form a vehicle group. The travel assistance device includes an environment perception unit configured to perceive a size of a vacant region of a lane based on vehicle information and surrounding information related to the vehicles that form the vehicle group, the lane serving as a destination lane of the vehicle group, and a platoon control unit configured to select a rearmost mode on condition that the size of the vacant region is less than or equal to a predetermined size and select a head mode on condition that the size of the vacant region is greater than the predetermined size. The rearmost mode is a mode of executing lane changing of at least one vehicle (41 to 43) that forms the vehicle group other than a rearmost vehicle (44) after executing lane changing of the rearmost vehicle (44), the rearmost vehicle (44) being a vehicle located at a rearmost part of the vehicles that form the vehicle group. The head mode is a mode of executing lane changing of the vehicles (41 to 44) that form the vehicle group in response to lane changing of a head vehicle (41), the head vehicle (41) being a vehicle located at a head of the vehicles that form the vehicle group.

BRIEF DESCRIPTION OF THE DRAWINGS

FIG. 11 is a flowchart of the platooning assistance control in the rearmost vehicle.

MODES FOR CARRYING OUT THE INVENTION

First Embodiment

Figure 1:
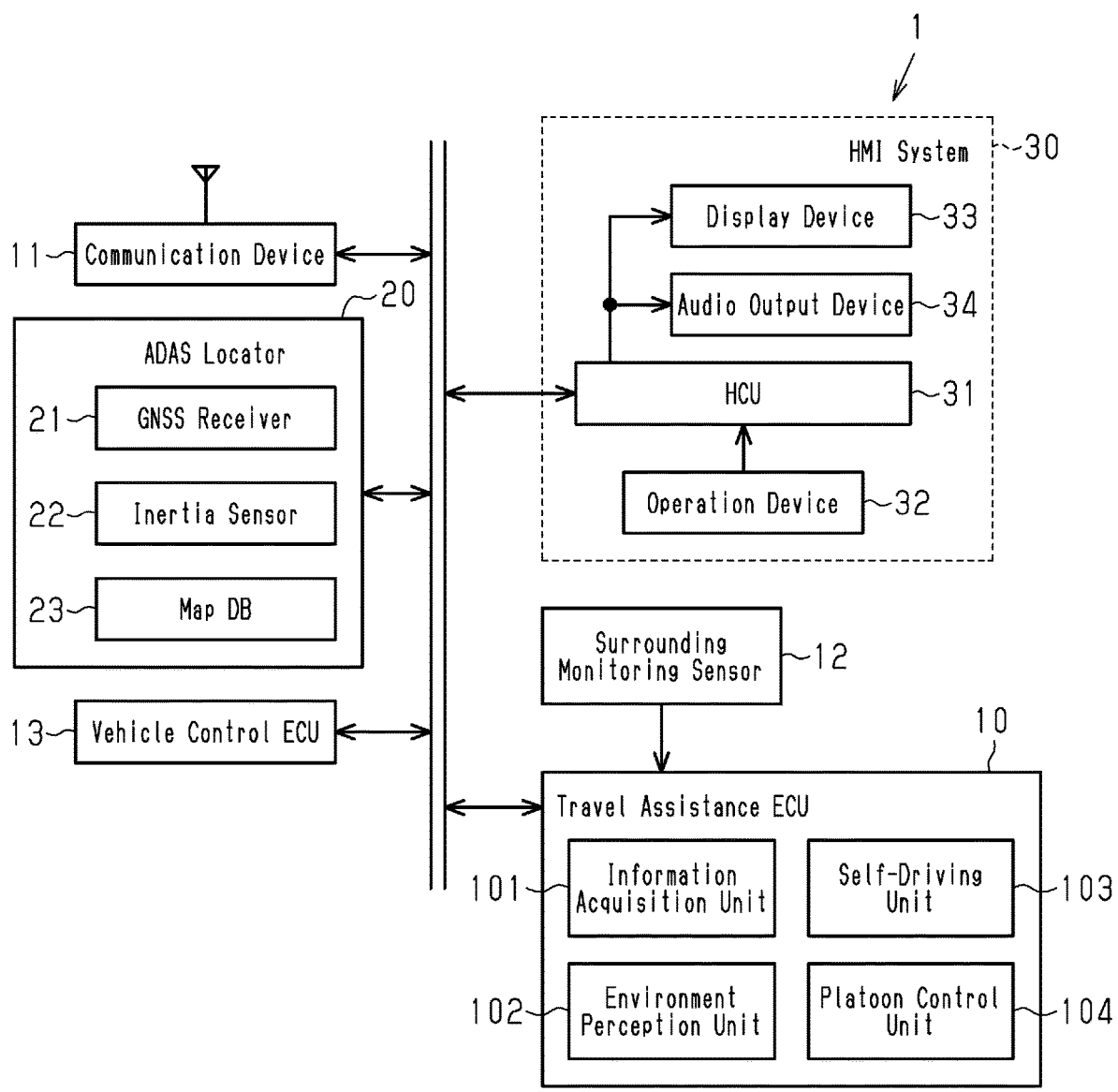
FIG. 1 is a schematic diagram of a vehicle-side unit including a travel assistance device according to an embodiment.

FIG. 1 shows a vehicle-side unit 1, which includes a travel assistance device according to an embodiment. The travel assistance device may be a travel assistance electronic control unit (ECU) 10. The vehicle-side unit 1 is implemented in a cooperative adaptive cruise control (CACC) system. Installing the vehicle-side unit 1 in a vehicle allows the vehicle to share acceleration/deceleration information of a lead vehicle in a platooning vehicle group and control the distance between vehicles more accurately. Thus, the vehicle forms a platooning vehicle group. Platooning refers to the traveling of vehicles in a platoon by executing a travel control to follow the lead vehicle.

The vehicle-side unit 1 includes the travel assistance ECU 10, a communication device 11, an advanced driver assistance systems (ADAS) locator 20, a human machine interface (HMI) system 30, a surrounding monitoring sensor 12, and a vehicle control ECU 13. The travel assistance ECU 10, the communication device 11, the ADAS locator 20, the HMI system 30, and the vehicle control ECU 13 are connected to, for example, an in-vehicle LAN, and execute communication to transmit and receive information to and from each other. The travel assistance ECU 10, the communication device 11, the ADAS locator 20, the HMI system 30, the vehicle control ECU 13, or a component thereof may be circuitry including: 1) one or more processors that operate according to a computer program (software); 2) one or more dedicated hardware circuits such as application specific integrated circuits (ASICs) that execute at least part of various processes; or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

The communication device 11 executes wireless communication with a communication device 11 of the vehicle-side unit 1 installed in another vehicle, a roadside unit arranged on a roadside, or an external center of the host vehicle. In this specification, the wireless communication with the communication device 11 of the vehicle-side unit 1 installed in another vehicle is referred to as vehicle-to-vehicle communication, the wireless communication with the roadside unit is referred to as road-to-vehicle communication, and the communication with the center is referred to as wide-range communication.

The vehicle-to-vehicle communication and the road-to-vehicle communication may be executed using a radio wave of, for example, 700 MHz band, 760 MHz band, 2.4 GHz band, or 5.9 GHz band. The maximum communication distance of the vehicle-to-vehicle communication and the road-to-vehicle communication is longer than a distance in which the number of vehicles in a vehicle group can be checked by the naked eye, for example, several hundred meters. The wide-range communication may be executed using a communication module for executing communication via a mobile phone network or via a public communication network such as the Internet. For example, the communication with the center via a communication network for telematics communication may be executed using an onboard communication module for telematics communication, such as a data communication module (DCM).

The communication device 11 is capable of transmitting the information of the host vehicle through the vehicle-to-vehicle communication, through the road-to-vehicle communication, or through the wide-range communication. The communication device 11 is also capable of receiving the information of another person transmitted from another vehicle through the vehicle-to-vehicle communication, through the road-to-vehicle communication via a roadside unit, or through the wide-range communication. When the wide-range communication is executed for vehicles to transmit and receive the information of the vehicles to and from each other via the center, the vehicles may transmit and receive information including vehicle positions to make adjustment such that vehicles within a certain range transmit and receive the information of the vehicles to and from each other based on the vehicle positions.

The ADAS locator 20 includes a global navigation satellite system (GNSS) receiver 21, an inertia sensor 22, and a map database (hereinafter referred to as DB) 23, which stores map data. The GNSS receiver 21 receives position measurement signals from artificial satellites. The inertia sensor 22 includes, for example, a three-axis gyro sensor and a three-axis acceleration sensor. The map DB 23 is a non-volatile memory that stores map data, such as link data, node data, and road shapes.

The ADAS locator 20 combines position measurement signals received by the GNSS receiver 21 with measurement results of the inertia sensor 22 to consecutively measure a vehicle position of the host vehicle equipped with the ADAS locator 20. The vehicle position may be represented by, for example, latitude and longitude coordinates. The vehicle position may be measured using, for example, a travel distance obtained from pulse signals that are consecutively output from a wheel speed sensor installed in the host vehicle. Then, the measured vehicle position is output to the in-vehicle LAN. Further, the ADAS locator 20 reads map data from the map DB 23 and outputs it to the in-vehicle LAN. Map data may be acquired from the outside of the host vehicle via the communication device 11.

As shown in FIG. 1, the HMI system 30 includes a human machine interface control unit (HCU) 31, an operation device 32, a display device 33, and an audio output device 34. The HMI system 30 is capable of receiving input operations from the driver of the host vehicle and presenting information to the driver of the host vehicle.

The operation device 32 is a switch group that is operated by the driver of the host vehicle. The operation device 32 is used to make various settings. Examples of the operation device 32 include a steering switch provided on a spoke part of the steering wheel of the host vehicle, a touch switch integrated with the display device 33, and the like.

The display device 33 displays a text and/or image to present information. Examples of the display device 33 include a combination meter, a center information display (CID), and a head-up display (HUD). The audio output device 34 outputs audio to present information. Examples of the audio output device 34 include an audio speaker.

The HCU 31 includes a CPU, a volatile memory, a non-volatile memory, an I/O, and a bus that connects them to each other, and executes control programs stored in the non-volatile memory to execute various processes. The HCU 31 is capable of causing the display device 33 and/or the audio output device 34 to present information in accordance with the instructions from the travel assistance ECU 10.

The surrounding monitoring sensor 12 detects a moving object such as a pedestrian, animal other than a human being, bicycle, motorcycle, and another vehicle. The surrounding monitoring sensor 12 also detects an obstacle around the host vehicle, for example, a still object such as a falling object, guardrail, curb, and tree. In addition, the surrounding monitoring sensor 12 detects a road mark such as travel zone line and stop line around the host vehicle. Examples of the surrounding monitoring sensor 12 include a surrounding monitoring camera that captures a predetermined range of the surroundings of the host vehicle, and a millimeter wave radar, sonar, or light detection and ranging/laser imaging detection and ranging (LIDAR) sensor that transmits an exploration wave to the predetermined range of the surroundings of the host vehicle. The surrounding monitoring camera consecutively outputs, to the travel assistance ECU 10 as sensing information, images that are to be consecutively captured. The sensor that transmits an exploration wave, such as a sonar, millimeter wave radar, or a LIDAR sensor, consecutively outputs, to the travel assistance ECU 10 as sensing information, a scanning result that is based on a received signal obtained when a reflection wave reflected by an obstacle is received.

Of acceleration/deceleration control and steering control of the host vehicle, the vehicle control ECU 13 is an electronic control unit that executes at least the acceleration/deceleration control. Examples of the vehicle control ECU 13 include a power unit control ECU and braking ECU that execute the acceleration/deceleration control and a steering ECU that executes the steering control. The vehicle control ECU 13 acquires detection signals output from sensors such as an accelerator position sensor, a brake depression sensor, a steering angle sensor, and a wheel speed sensor, and outputs control signals to travel control devices such as an electronic control throttle, a brake actuator, and an electric power steering (EPS) motor. Further, the vehicle control ECU 13 is capable of outputting, to the in-vehicle LAN, the detection signals of the above-described sensors.

The travel assistance ECU 10 includes a CPU, a volatile memory, a non-volatile memory, an I/O, and a bus that connects them to each other, and executes control programs stored in the non-volatile memory to execute various processes for the travel assistance of the host vehicle. Part of or all of the functions executed by the travel assistance ECU 10 may be configured in a hardware manner by, for example, one or more ICs.

The travel assistance ECU 10 is a travel assistance device that executes a travel assistance for platooning of vehicles that form a vehicle group. The travel assistance ECU 10 includes an information acquisition unit 101, an environment perception unit 102, a self-driving unit 103, and a platoon control unit 104.

The information acquisition unit 101 acquires, via the communication device 11, vehicle information transmitted from another vehicle. The vehicle information transmitted from another vehicle includes the information related to vehicle behavior, such as identification information (for example, vehicle ID) used to identify the other vehicle, the vehicle position of the other vehicle, and the vehicle speed of the other vehicle.

The environment perception unit 102 perceives the traveling environment of the host vehicle from, for example, the vehicle position of the host vehicle and the map data acquired from the ADAS locator 20, the sensing information acquired from the surrounding monitoring sensor 12, and the vehicle information of another vehicle acquired by the information acquisition unit 101. For example, inside of the sensing range of the surrounding monitoring sensor 12, the environment perception unit 102 perceives the shape and movement state of an object around the host vehicle from the sensing information acquired from the surrounding monitoring sensor 12 to create a virtual space that simulates an actual traveling environment. In addition, outside of the sensing range of the surrounding monitoring sensor 12, the environment perception unit 102 uses map data and various information that has been acquired by the information acquisition unit 101 to perceive the traveling environment. The information of the traveling environment perceived by the environment perception unit 102 in each vehicle is transmitted and received as surrounding information together with a vehicle ID via the communication device 11.

The self-driving unit 103 is capable of executing self-driving by causing the vehicle control ECU 13 to automatically accelerate, brake, or steer the host vehicle in accordance with a travel plan created in the host vehicle or in accordance with an instruction or travel plan received by the communication device 11.

When a travel plan is created in the host vehicle, for example, a recommended route with which the host vehicle heads for a destination is created as a mid-and-long-term travel plan using the vehicle position of the host vehicle and the map data acquired from the ADAS locator 20. Further, a short-term travel plan is created using a virtual space around the host vehicle obtained by the environment perception unit 102. More specifically, a travel plan is created to execute, for example, steering for lane changing, acceleration/deceleration for speed adjustment, and steering and braking for obstacle avoidance.

The self-driving unit 103 may be configured to execute self-driving in accordance with the instruction or travel plan received by the communication device 11. For example, when executing platooning or the like, the self-driving unit 103 may be configured to acquire the information of the acceleration, steering angle or the like of the head vehicle of a platoon transmitted from the head vehicle and automatically control the host vehicle such that the host vehicle has the same acceleration or steering angle as the head vehicle. Alternatively, the self-driving unit 103 may be configured to automatically execute the acceleration/deceleration control for the host vehicle such that the host vehicle follows its lead vehicle (preceding vehicle) while keeping a predetermined vehicle width distance from the lead vehicle.

Examples of the functions incorporated in the self-driving unit 103 to execute self-driving include an adaptive cruise control (ACC) function to control the traveling speed of the host vehicle so as to keep a target following distance from the lead vehicle by adjusting the drive force and brake force, a lane keeping assist (LKA) function to keep a traveling lane and cause the vehicle to travel by generating a steering force that acts in a direction preventing the approach to a travel zone line, and a lane change assist (LCA) function to automatically move the vehicle to a neighboring lane. Additionally, the self-driving unit 103 may include, for example, an autonomous emergency braking (AEB) function to compulsorily decelerate the host vehicle by generating a braking force based on the sensing information of the front side. The above-described functions may be incorporated in the self-driving unit 103 as an Acc unit, LKA unit, LCA unit (lane changing unit), and AEB unit.

In addition, the above-described functions may be applied only to the host vehicle or may be applied also to the other vehicles that form a vehicle group. For example, the LCA unit (lane changing unit) may be capable of determining only whether the lane of the host vehicle can be changed or may be capable of determining also whether the lanes of the other vehicles that form the vehicle group can be changed.

In the travel assistance ECU 10 of the head vehicle, the LCA unit may be capable of steering the following vehicles and the rearmost vehicle at the same time as executing steering for changing the lane of the head vehicle. For example, when changing the lane of the vehicle group, the LCA unit of the head vehicle may be configured to generate a signal that instructs steering in the same phase for the travel assistance ECUs 10 of the other vehicles. Alternatively, when changing the lane of the vehicle group, the LCA unit of the head vehicle may steer only the head vehicle. During platooning, the other vehicles are controlled so as to follow the head vehicle while keeping a certain following distance from the head vehicle. Thus, when only the head vehicle is steered to execute lane changing, the other vehicles can follow the head vehicle and sequentially change their lanes.

Furthermore, the self-driving unit 103 may be capable of switching the above-described self-driving functions between execution and non-execution. For example, the self-driving unit 103 may be capable of switching each of the self-driving functions between execution and non-execution or may be capable of collectively switching multiple or all of the self-driving functions between execution and non-execution. The switching of the self-driving functions between execution and non-execution may be executed with, for example, an input operation performed by the driver for the operation device 32 or an instruction from the platoon control unit 104. Alternatively, the switching may be autonomously executed by the self-driving unit 103 in correspondence with, for example, the surrounding environment perceived by the environment perception unit 102, malfunction of the sensing in the surrounding monitoring sensor 12, or a communication error of the communication device 11.

When the host vehicle is platooning, the platoon control unit 104 executes a process that executes platooning. Further, based on the position (arrangement order) of the host vehicle in a platooning vehicle group, the platoon control unit 104 determines whether the host vehicle is a head vehicle (a vehicle located at the head), a following vehicle (a vehicle located between a head vehicle and a rearmost vehicle), and a rearmost vehicle (a vehicle located at the rearmost part). Based on this determination, the platoon control unit 104 changes the contents of an instruction to the autonomous driving unit 103 or the like.

The position of the host vehicle in a vehicle group can be determined based on, for example, the surrounding information recognized by the environment perception unit 102. The platoon control unit 104 simply needs to determine that the host vehicle is a head vehicle located at the head of platooning when the environment perception unit 102 does not perceive a vehicle at the front of the host vehicle (in the traveling direction). Also, the platoon control unit 104 simply needs to determine that the host vehicle is a rearmost vehicle located at the rearmost part of platooning when the environment perception unit 102 does not perceive a vehicle at the rear of the host vehicle (in the direction opposite to the traveling direction). When the host vehicle is neither a head vehicle nor a real most vehicle, the platoon control unit 104 simply needs to determine that the host vehicle is a following vehicle. Alternatively, the platoon control unit 104 may be capable of identifying the position of a vehicle from, for example, the correspondence between the position of the vehicle in a vehicle group and a vehicle ID without using the environment perception unit 102.

When the host vehicle is a head vehicle, the platoon control unit 104 instructs the self-driving unit 103 to create a travel plan and travel in accordance with the travel plan. The travel plan is created based on both the vehicle information and surrounding information of the host vehicle and the vehicle information and surrounding information transmitted from another vehicle.

Additionally, the platoon control unit 104 may transmit vehicle group information, which is used to operate the entirety of a vehicle group, from the communication device 11 to another vehicle group. More specifically, the vehicle group information includes the travel plan and behavior information (for example, acceleration and steering angle) of a head vehicle and includes an instruction to another vehicle.

When the host vehicle is a head vehicle, the platoon control unit 104 is capable of instructing the self-driving unit 103 to create a travel plan related to lane changing on issuance of a lane changing instruction for a vehicle group. Further, the platoon control unit 104 is capable of transmitting the created travel plan related to lane changing as vehicle group information from the communication device to another vehicle. The lane changing instruction may be issued by the driver of a head vehicle, issued from the self-driving unit 103 of each vehicle of a vehicle group, or received through road-to-vehicle communication from the outside of the vehicle group.

The platoon control unit 104 may be configured to permit the lane of each vehicle forming a vehicle group to be changed on condition that it is determined that the lane of each vehicle forming the vehicle group can be changed. Whether the lane of each vehicle can be changed is determined using the LCA function of the self-driving unit 103. For example, the travel assistance ECU 10 installed in each vehicle may determine whether the lane of the host vehicle can be changed and transmit the determination result to the travel assistance ECU 10 of the head vehicle. Alternatively, the self-driving unit 103 in the travel assistance ECU 10 of the head vehicle may determine whether the lane of the entire vehicle group can be changed.

The platoon control unit 104 may be configured to select whether lane changing is executed in a rearmost mode or in a head mode based on the size of the vacant region of a lane that serves as the destination lane of the vehicle group. In the rearmost mode, after the lane of the rearmost vehicle is changed, the lanes of the head vehicle and the following vehicle are changed. Here, "after the lane of a rearmost vehicle is changed" simply needs to mean after the rearmost vehicle enters a vehicle changing state. For example, this may be after the lane changing of the rearmost vehicle is completed, after it is determined that the lane of the rearmost vehicle starts to be changed, or after the lane of the rearmost vehicle actually starts to be changed. The head mode is to change the lane of the rearmost vehicle in the same manner as the following vehicle in response to changing the lane of the head vehicle.

For example, the platoon control unit 104 may be configured to select the rearmost mode when the size of the vacant region is less than or equal to a predetermined size and select the head mode when the size of the vacant region is greater than the predetermined size. The size of the vacant region may be perceived by the environment perception unit 102 based on the vehicle information and surrounding information of each vehicle. In the destination lane of a vehicle group, the vacant region can be, for example, a region where an unrelated vehicle (another vehicle that does not form a vehicle group) does not exist.

In the rearmost mode, the platoon control unit 104 instructs the rearmost vehicle to execute standby traveling during a period from the execution of the lane changing of the rearmost vehicle to the completion of the lane changing of the entire vehicle group. In the standby traveling, the rearmost vehicle changes its lane individually and then follows the vehicle group in the lane in the traveling direction of the vehicle group. In platooning, the rearmost vehicle travels with the distance to the vehicle group kept in the horizontal direction (a normal direction of the traveling direction) and travels with a predetermined following distance, which allows the rearmost vehicle to follow the vehicle group, kept in the traveling direction such that the rearmost vehicle can travel in the destination lane.

In the rearmost mode, during the standby traveling of the rearmost vehicle, the platoon control unit 104 may instruct the distance (referred to as rearmost distance) in the traveling direction of a vehicle group between the rearmost vehicle and the following vehicle (lead vehicle) closest to the rearmost vehicle in the vehicle group to be changed from the rearmost distance during normal platooning. Setting the rearmost distance of the rearmost vehicle during the standby traveling to be shorter than the rearmost distance of the rearmost vehicle during the normal platooning limits situations in which an unrelated vehicle (a vehicle that does not form a vehicle group) passes through a section between the lead vehicle and the rearmost vehicle and cut in front of the rearmost vehicle.

When the host vehicle is the following vehicle or the rearmost vehicle, the platoon control unit 104 transmits the vehicle information and surrounding information of the host vehicle to the head vehicle. To transmit the information, for example, the vehicle ID of the head vehicle indicating a transmission destination in addition to the vehicle ID of the head vehicle indicating a transmission source may be given such that it is possible to identify which vehicle has transmitted the information.

Further, in the following vehicle and the rearmost vehicle, the platoon control unit 104 instructs the self driving unit 103 to execute platooning based on the behavior information and travel plan of the head vehicle acquired by the information acquisition unit 101. The self-driving unit 103 causes the following vehicle and the rearmost vehicle to platoon by creating a travel plan to automatically execute acceleration/deceleration control such that the following vehicle and the rearmost vehicle have the same acceleration/deceleration as the head vehicle.

During changing of the lane of the vehicle group, when the travel assistance ECU 10 installed in each vehicle determines, for example, whether the lane of the host vehicle can be changed, the platoon control unit 104 causes the head vehicle to transmit the determination result in the following vehicle and the rearmost vehicle. The determination results in the vehicles may be concentrated in the travel assistance ECU 10 of the head vehicle to determine, for example, whether the lane of the entire vehicle group can be changed.

FIGS. 2 to 6 show the flowcharts of a platooning assistance control executed b the travel assistance ECU 10 of each vehicle when platooning is executed by the driver riding only on the head vehicle.

Figure 2:
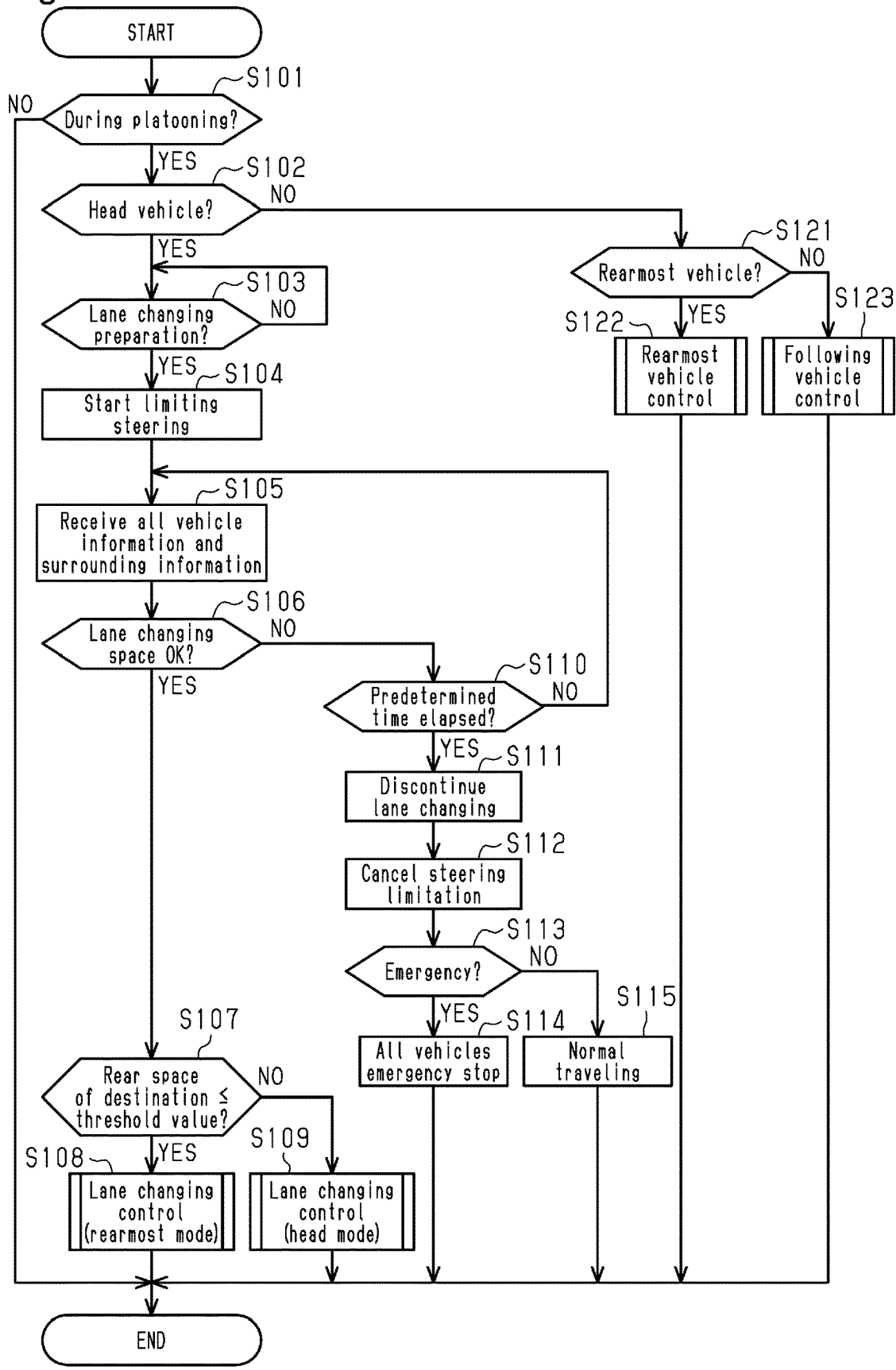
FIG. 2 is a flowchart of a platooning assistance control executed by a travel assistance ECU.

In the travel assistance ECU 10 of each vehicle, the processes of the main routine shown in FIG. 2 are executed. The process shown in step S103 corresponds to the process executed by a first control unit.

First, in step S101, it is determined whether platooning is being executed. When platooning is being executed, the process is advanced to step S102. When platooning is not being executed, the process is ended.

In step S102, it is determined whether the host vehicle is a head vehicle located at the head of the platooning vehicle group. When the host vehicle is a head vehicle, the travel assistance control for the head vehicle shown in steps S103 to S115 is executed. When the host vehicle is not a head vehicle, the process is advanced to step S121 to determine whether the host vehicle is a rearmost vehicle. When the host vehicle is a rearmost vehicle, the travel assistance control for the rearmost vehicle shown in step S122 is executed. When the host vehicle is not a rearmost vehicle, the travel assistance control for a following vehicle shown in step S123 is executed. The controls executed by the travel assistance ECUs 10 of the rearmost vehicle and the following vehicle will be described later.

First, in step S103, the travel assistance ECU 10 of the head vehicle determines whether the instruction of a lane changing preparation has been given. This instruction may be given by the driver of the head vehicle or by the travel assistance ECU 10. The instruction of the lane changing preparation is given for the purpose of, for example, passing another vehicle, changing a route, or avoiding an obstacle. When the instruction is given by the driver, for example, the instruction of a vehicle changing preparation is input to the HMI system 30. For this input, the reason for changing the lane may also be selected and input.

When the instruction of the lane changing preparation has been given in step S103, the process is advanced to step S104 to limit steering of the steering wheel of the head vehicle. More specifically, for example, the load on the steering wheel is increased so that the steering of the steering wheel to change the lane is limited. Additionally, when steering is performed, a warning may be presented by the display device 33 or the audio output device 34.

Next, in step S105, the vehicle information and surrounding information of all the vehicles are acquired. Further, in step S106, the acquired vehicle information and surrounding information of all the vehicles are used to determine whether the space where the vehicle can move (referred to as lane changing space) exists in a destination lane. When the lane changing space does not exist, the process is advanced to step S110 to determine whether a predetermined time has elapsed since the lane changing preparation. When the predetermined time has not elapsed, the process is returned to step S105. When the predetermined time has elapsed, the processes related to a lane changing discontinuation shown in steps S111 to S115, which will be described later, are executed. When the lane changing space exists, the process is advanced to step S107.

In step S107, it is determined whether the vacant region of the destination lane is less than or equal to a predetermined size. More specifically, it is determined whether distance X from the rear end of the vehicle group (that is, the rear end of the rearmost vehicle) subsequent to the lane changing to the front end of a subsequent vehicle, which travels behind the vehicle group, is less than or equal to a predetermined threshold value. This threshold value may be calculated in correspondence with the speed of the vehicle group of which the lane is changed or in correspondence with the speed and acceleration of a vehicle (in particular, subsequent vehicle) traveling around the vehicle group.

In step S107, when the size of a rear space is less than or equal to the threshold value, the process is advanced to step S108 to execute the lane changing control of the rearmost mode. In the rearmost mode, after the lane of the rearmost vehicle is changed, the lanes of the head vehicle and the following vehicle are changed. By contrast, when the size of the rear space is greater than the threshold value in step S107, the process is advanced to step S109 to execute the lane changing control of the head mode. The head mode is to change the lane of the rearmost vehicle in the same manner as the following vehicle in response to changing the lane of the head vehicle.

In the processes related to the lane changing discontinuation shown in steps S111 to S115, the discontinuation of lane changing is determined in step S111 and then the process is advanced to step S112. In this step, the steering limitation that has been set in step S104 is cancelled.

Next, the process is advanced to step S113 to determine whether the reason for lane changing is emergent. For example, when the instruction of the lane changing preparation is issued for the purpose of avoiding emergency such as avoiding an obstacle, the process is advanced to step S114 to execute emergent stopping operation for the all the vehicles. Then, the process is ended. When the lane changing is an unnecessary one like passing another vehicle, the process is advanced to step S115 to determine to continue normal platooning. Then, the process is ended.

Figure 3:
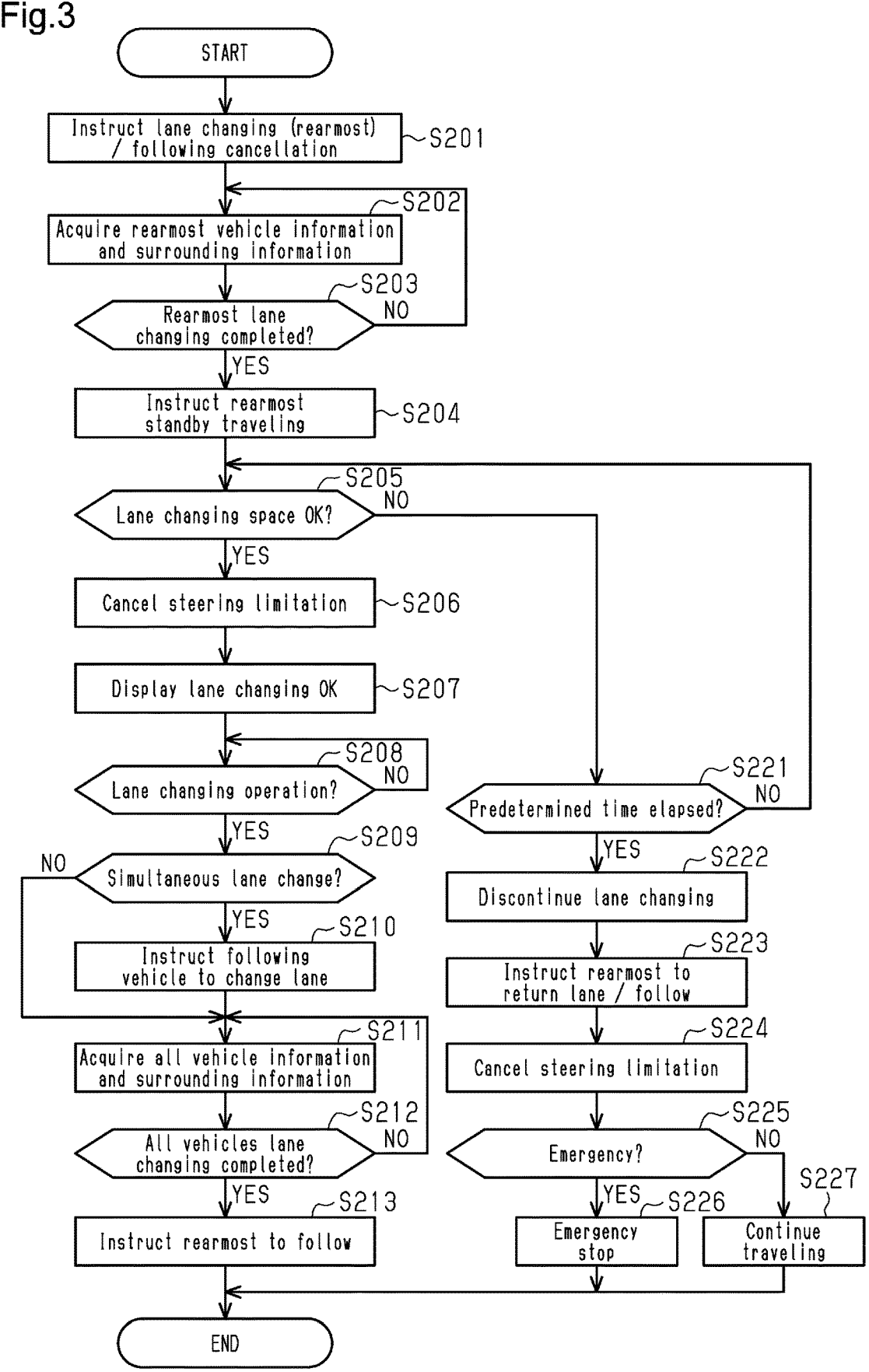
FIG. 3 is a flowchart of a lane changing control (rearmost mode) in the head vehicle.

FIG. 3 shows the flowchart of the lane changing control in the rearmost mode executed by the travel assistance ECU 10 of the head vehicle. The process shown in step S201 corresponds to the process executed by the first control unit. The processes shown in steps S203 to S207 correspond to the processes executed by a second control unit. The processes shown in steps S204, S212, and S213 correspond to the processes executed by a standby traveling control unit. The processes shown in steps S208 to S210 correspond to the processes executed by a steering adjuster.

First, in step S201, the rearmost vehicle is instructed to change its lane and a following cancellation instruction is given to the rearmost vehicle. This causes the rearmost vehicle to leave the vehicle group and change the lane.

Next, in step S202, the vehicle information and surrounding information of the rearmost vehicle are acquired and the process is advanced to step S203. In step S203, the vehicle information and surrounding information of the rearmost vehicle acquired in step S202 are used to determine whether the lane changing of the rearmost vehicle is completed. When the lane changing is not completed, the process is returned to step S202 to reacquire the vehicle information and surrounding information of the rearmost vehicle. When the lane changing is completed, the process is advanced to step S204. In this step, the head vehicle instructs the rearmost vehicle to execute the standby traveling. This instruction causes the rearmost vehicle to continue to travel while standing by at the rearmost position of the lane changing space in the destination lane.

Next, the process is advanced to step S205 to determine whether the lane changing space for the head vehicle and the following vehicle exists. When the lane changing space does not exist, the process is advanced to step S221 to determine whether a predetermined time has elapsed since the lane changing preparation. When the predetermined time has not elapsed, the process is returned to step S205. When the predetermined time has elapsed, the processes related to the lane changing discontinuation shown in steps S222 to S227, which will be described later, are executed. When the lane changing space exists, the process is advanced to step S206.

In step S206, the steering limitation that has been set n step S104 is cancelled and the process is advanced to step S207. In step S207, the display device 33, the audio output device 34 of the HMI system 30, or the like notifies the driver of the head vehicle that the lane changing preparation is completed and a lane changing operation can be performed.

Next, the process is advanced to step S208 to determine whether the driver of the head vehicle has performed a steering operation for lane changing. More specifically, it is determined that the driver of the head vehicle has operated the steering wheel to change the lane to a destination lane.

Next, in step S209, it is determined whether to simultaneously change the lane of the head vehicle and change the lane of the following vehicle. When the lanes are changed simultaneously, the process is advanced to step S210 to instruct the following vehicle to change its lane. More specifically, the steering angle, acceleration, and the like of the head vehicle are transmitted to the following vehicle, and the instruction is given to automatically control the following vehicle such that the following vehicle has the same steering angle and acceleration as the lead vehicle. Then, the process is advanced to step S211. When the lanes are not changed simultaneously, the process is advanced from step S209 to step S211. In this case, the following vehicle follows the lead vehicle, and the lanes are sequentially changed from the head vehicle.

Then, in step S211, the vehicle information and surrounding information of all the vehicles are acquired and the process is advanced to step S212. In step S212, the vehicle information and surrounding information of all the vehicles acquired in step S211 are used to determine whether the lane changing of all the vehicles is completed. When the lane changing is not completed, the process is returned to step S211. When the lane changing is completed, the process is advanced to step S213.

In step S213, the rearmost vehicle is instructed to execute a following travel. This causes the rearmost vehicle to cancel the standby traveling and restart following the lead vehicle. Step S213 is executed to end the lane changing control of the rearmost mode, and the processes of the main routine are ended as shown in FIG. 2.

In the processes related to the lane changing discontinuation shown in steps S222 to S227, the discontinuation of lane changing is determined in step S222 and then the process is advanced to step S223. In step S223, the rearmost vehicle is instructed to return to the original lane and execute the following travel. This instruction causes the rearmost vehicle to change its lane to a lane where the lead vehicle and the following vehicle are traveling and execute the following travel at the rearmost part of the vehicle group. Subsequently, the process is advanced to step S224. The processes of steps S224 to S227 are the same as those of steps S112 to S115 shown in FIG. 2 and thus will not be described. Step S226 or S227 is executed to end the lane changing control of the rearmost mode, and the processes of the main routine are ended as shown in FIG.

Figure 4:
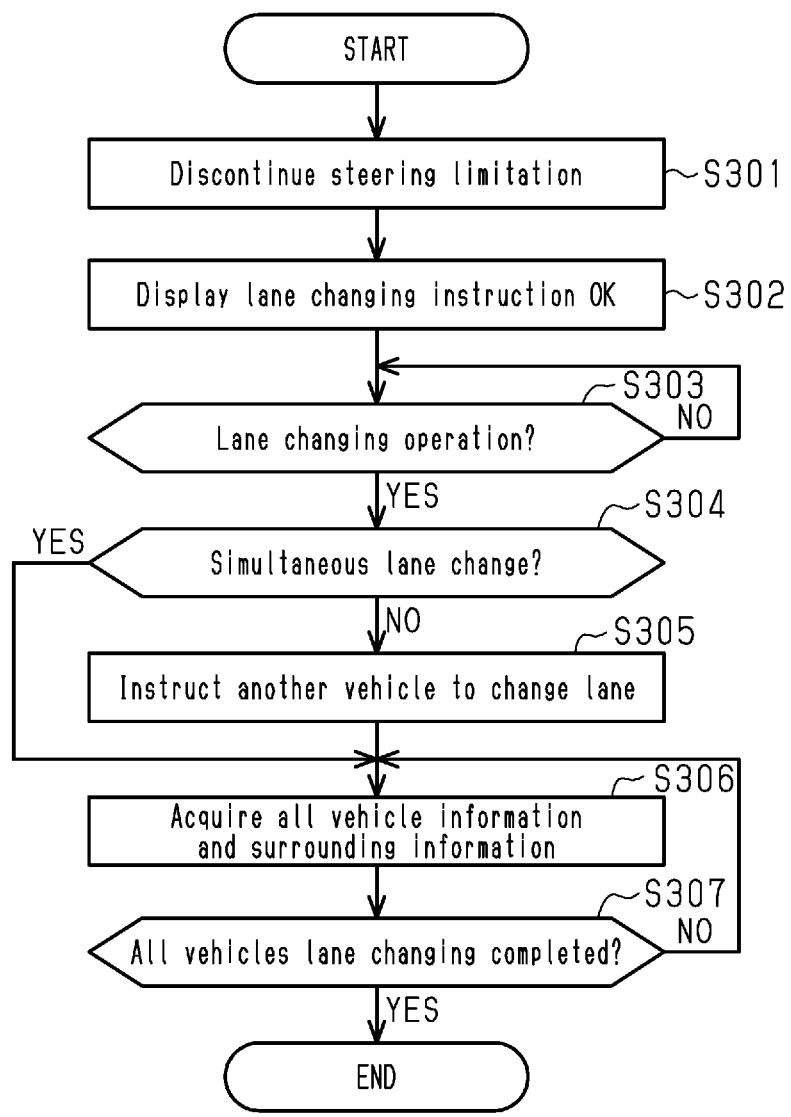
FIG. 4 is a flowchart of a lane changing control (head mode) in the head vehicle.

FIG. 4 shows the flowchart of the lane changing control in the head mode executed by the travel assistance ECU 10 of the head vehicle. The processes of steps S301 to S303 are the same as those of steps S206 to S208 shown in FIG. 3 and thus will not be described.

After step S303, the process is advanced to step S304. In step S304, it is determined whether to simultaneously change the lane of the head vehicle and change the lanes of the other vehicles (that is, the following vehicle and the rearmost vehicle). When the lanes are changed simultaneously, the process is advanced to step S305 to instruct the other vehicles to change the lanes. More specifically, the steering angle, acceleration, and the like of the head vehicle are transmitted to the following vehicle and the rearmost vehicle, and the instruction is given to automatically control the following vehicle and the rearmost vehicle such that the following vehicle and the rearmost vehicle have the same steering angle and acceleration as the lead vehicle. Afterwards, the process is advanced to step S306. When the lanes are not changed simultaneously, the process is advanced from step S304 to step S306. In this case, the following vehicle and the rearmost vehicle follow the lead vehicle and sequentially change their lanes. Consequently, the lane of the entire vehicle group is changed.

Then, in step S306, the vehicle information and surrounding information of all the vehicles are acquired and the process is advanced to step S307. In step S307, the vehicle information and surrounding information of all the vehicles acquired in step S306 are used to determine whether the lane changing of all the vehicles is completed. When the lane changing is not completed, the process is returned to step S306. When the lane changing is completed, the lane changing control of the head mode is ended and the processes of the main routine are ended as shown in FIG. 2.

Figure 5:
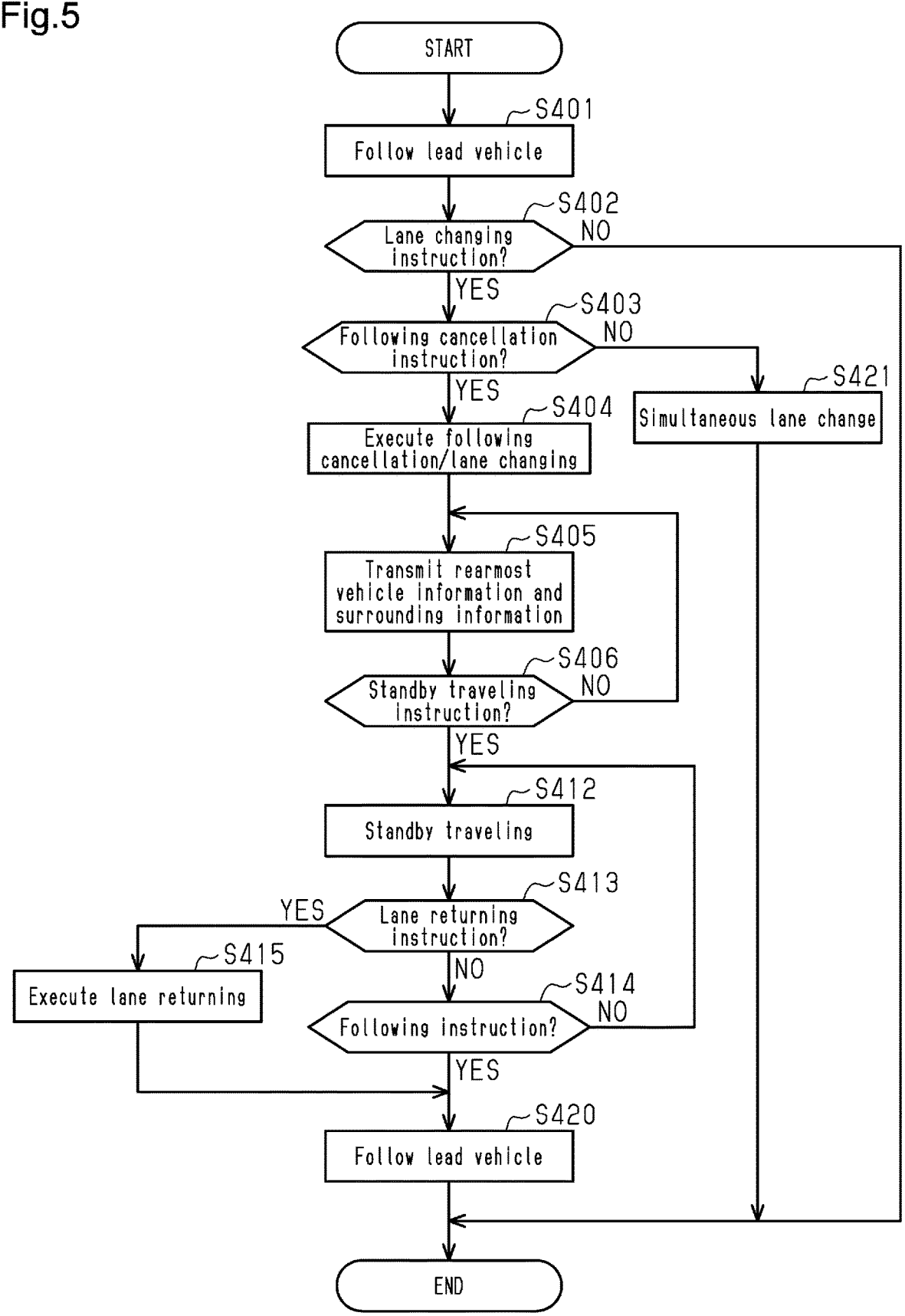
FIG. 5 is a flowchart of the platooning assistance control in the rearmost vehicle.

FIG. 5 shows the flowchart of a rearmost vehicle control (the control of step S122 in FIG. 2) executed by the travel assistance ECU 10 of the rearmost vehicle. The processes shown in step S406 and S412 correspond to the processes executed by the standby traveling control unit.

First, in step S401, the real most vehicle is controlled such that e rearmost vehicle follows the lead vehicle.

Next, in step S402, it is determined whether the lane changing instruction has been received from the head vehicle. When the lane changing instruction has not been issued, the process is ended and the following travel is continued. When the lane changing instruction has been issued, the process is advanced to step S403.

In step S403, it is determined whether a cancellation instruction of the following travel has been received from the head vehicle. When the cancellation instruction of the following travel has not been issued, the process is advanced to step S421. In this step, the rearmost vehicle executes a simultaneous lane change. That is, control is executed such that the rearmost vehicle is steered at the same time as the head vehicle in accordance with the instruction from the head vehicle. When the cancellation instruction of the following travel has been issued, the process is advanced to step S404. In this step, the following travel of the rearmost vehicle is cancelled and the lane changing is executed individually.

The instruction of lane changing for the rearmost vehicle is sent from the head vehicle in step S201 and step S210 of FIG. 3 and step S305 of FIG. 4. The instruction of the following cancellation is sent from the head vehicle in step S201 of FIG. 3. The fact that the lane changing instruction has been received and the following cancellation instruction has not been received corresponds to the fact that the instruction in step S210 or S305 has been sent from the head vehicle. Thus, when the lane changing instruction has been received and the following cancellation instruction has not been received, the simultaneous lane change is executed. The fact that the lane changing instruction has been received and the following cancellation instruction has been received corresponds to the fact that the instruction in step S201 has been sent from the head vehicle. Thus, the process is advanced to step S404. In this step, the lane of the rearmost vehicle is changed prior to the head vehicle and the following vehicle.

The process is advanced from step S404 to step S405. In step S405, the rearmost vehicle transmits to the head vehicle the vehicle information and surrounding information of the rearmost vehicle. As shown in steps S202 and S203 in FIG. 3, the head vehicle uses the transmitted vehicle information and surrounding information of the rearmost vehicle to determine whether the lane changing of the rearmost vehicle is completed. As shown in step S204, the head vehicle sends the instruction of the standby traveling to the rearmost vehicle.

Next, in step S406, it is determined whether the instruction of the standby traveling has been received from the head vehicle. When the instruction of the standby traveling has not been issued, the process is returned to step S405. When the instruction of the standby traveling has been issued, the process is advanced to step S412. In this step, the standby traveling is executed. That is, the rearmost vehicle continues to travel while standing by at the rearmost position of the lane changing space in the destination lane.

Next, in step S413, it is determined whether a lane returning instruction has been received from the head vehicle. In step S223 shown in FIG. 3, the head vehicle instructs the rearmost vehicle to return to the original lane and execute the following travel. When the lane returning instruction has been issued, the process is advanced to step S415. In this step, the rearmost vehicle is controlled such that the rearmost vehicle changes its lane to a lane where the head vehicle and the following vehicle are traveling. Then, the process is advanced to step S420. The process shown in step S420 causes the rearmost vehicle to restart following the lead vehicle. When the lane returning instruction has not been issued in step S413, the process is returned to step S414.

In step S414, it is determined whether the instruction of following the lead vehicle has been received from the head vehicle. The following instruction in step S414 corresponds to the instruction transmitted from the head vehicle in step S213 of FIG. 3. When the following instruction has not been issued, the process is returned to step S412. When the following instruction has been issued, the process is advanced to step S420. In this step, the rearmost vehicle is controlled such that the rearmost vehicle restarts following the lead vehicle. Step S420 is executed to end the process of the rearmost vehicle control shown in FIG. 5, and the processes of the main routine are ended as shown in FIG. 2.

Figure 6:
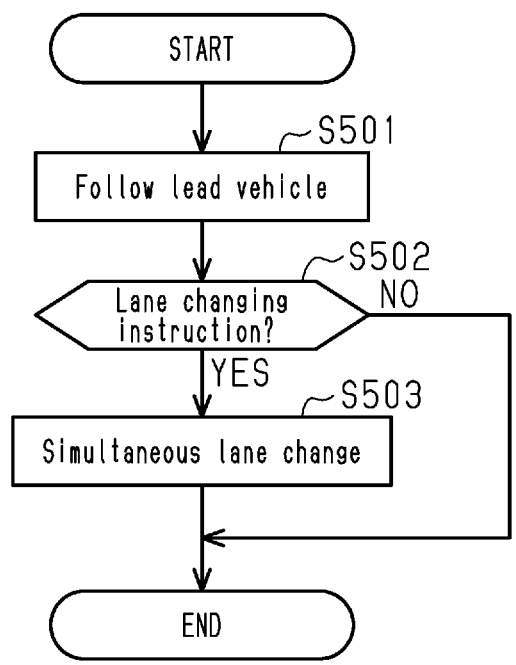
FIG. 6 is a flowchart of the platooning assistance control in the following vehicle.

FIG. 6 shows the flowchart of a following vehicle control (the control of step S123 in FIG. 2) executed by the travel assistance ECU 10 of the following vehicle. First, in step S501, the following vehicle is controlled such that the following vehicle follows the lead vehicle. Next, in step S502, it is determined whether the lane changing instruction has been received from the head vehicle. When the lane changing instruction has not been issued, the process is ended and the following travel is continued. When the lane changing instruction has been issued, the process is advanced to step S503.

In step S503, the following vehicle is controlled such that the following vehicle executes the simultaneous lane change. That is, control is executed such that the following vehicle is steered at the same time as the head vehicle in accordance with the instruction from the head vehicle. Step S503 is executed to end the process of the following vehicle control shown in FIG. 6, and the processes of the main routine are ended as shown in FIG. 2.

Figure 7A:
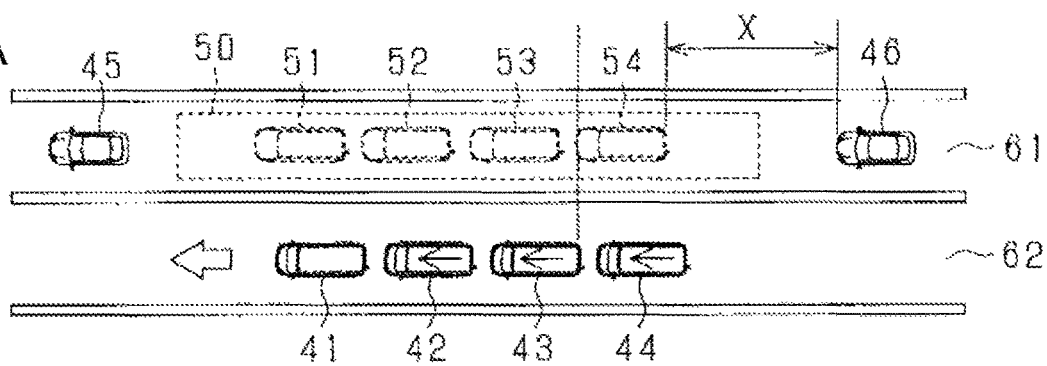
FIGS. 7A to 7E are conceptual diagrams illustrating the progress of the lane changing (rearmost mode) of the vehicle group during platooning.

FIGS. 7A to 7E, FIG. 8, and FIGS. 9A and 9B show conceptual diagrams each illustrating the progress of the lane changing of the vehicle group controlled by the travel assist ECU. As shown in FIG. 7A, a head vehicle 41 traveling in a lane 61, following vehicles 42 and 43, and a rearmost vehicle 44 of a vehicle group 40 are platooning in this order in the traveling direction. Further, the lane of the vehicle group 40 is changed to a lane 62. Such a case will now be described. A driver is riding in the head vehicle 41 and not in the following vehicles 42 and 43 or the rearmost vehicle 44. Self-driving is executed so that the following vehicles 42 and 43 and the rearmost vehicle 44 are following the head vehicle 41.

Referring to FIG. 7A, the head vehicle 41 determines whether a lane changing space 50 (the space where the vehicle group 40 can move) exists in the lane 61, which is a destination lane. When the lane changing space 50 exists, the head vehicle 41 determines to execute the lane changing. Changed vehicles 51 to 54, which are shown by the broken lines, indicate the positions of the head vehicle 41, following vehicles 42 and 43, rearmost vehicle 44 subsequent to predicted lane changing. At the front of the lane changing space 50, an unrelated vehicle 45 is traveling. At the rear of the lane changing space 50, an unrelated vehicle 46 is traveling.

The head vehicle 41 perceives the size of the vacant region of the lane 61. The vacant region is a region of the lane 61 from the rear end of the unrelated vehicle 45 and the front end of the unrelated vehicle 46. The head vehicle 41 determines whether the size of the vacant region on the rear side is less than or equal to a predetermined value. The head vehicle 41 determines whether distance X is less than or equal to a predetermined threshold value. Distance X is from the rear end of the vehicle group in the lane 61 (that is, the rear end of the changed vehicle 54 subsequent to the lane changing) to the front end of the unrelated vehicle 46 that is traveling behind the changed vehicle 54.

Figure 7B:
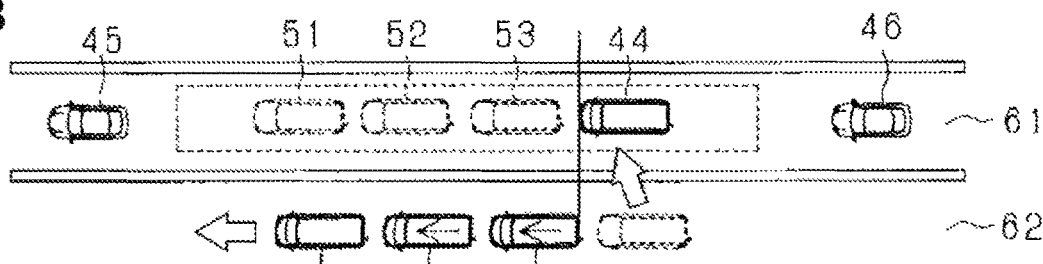

When distance X is less than or equal to the threshold value, the head vehicle 41 executes the lane changing in the rearmost mode. First, as shown in FIG. 7B, lane changing is instructed for the rearmost vehicle 44 so that the rearmost vehicle 44 changes its lane from the lane 62 to the lane 61. The front end of the rearmost vehicle 44 in the lane 61 may be located at the same position as the rear end of the following vehicle 43 or may be located frontward from the rear end of the following vehicle 43. This prevents another vehicle (unrelated vehicle) from cutting in front of the rearmost vehicle 44 from the rear of the following vehicle 43 and entering the lane changing space 50. When changing the lane, the rearmost vehicle 44 stops following the following vehicle 43 and individually executes the standby traveling in the lane 61. Dining the standby traveling, the rearmost vehicle 44 travels while keeping a relative positional relationship with the following vehicle 43 shown in FIG. 7B.

Subsequently, referring to FIG. 7C, the head vehicle 41 determines whether a lane changing space 55 exists. The lane changing space 55 is a front space of the rearmost vehicle 44 and a space where the head vehicle 41 and the following vehicles 42 and 43 can move. The traveling of the rearmost vehicle 44 in the lane 61 prevents the unrelated vehicle 46, which is subsequent to the rearmost vehicle 44, from entering the lane changing space 55. Additionally, the traveling of the rearmost vehicle 44 while keeping a relative positional relationship with the following vehicle 43 ensures the lane changing space 55.

When the lane changing space 55 exists, the head vehicle 41 can be steered. In this case, as shown in FIG. 7D, the driver of the head vehicle 41 performs steering to change its lane from the lane 62 to the lane 61. The following vehicle 42 changes its lane to the lane 62 by following the head vehicle 41. The following vehicle 43 changes its lane to the lane 62 by following the following vehicle 42.

Figure 7C:
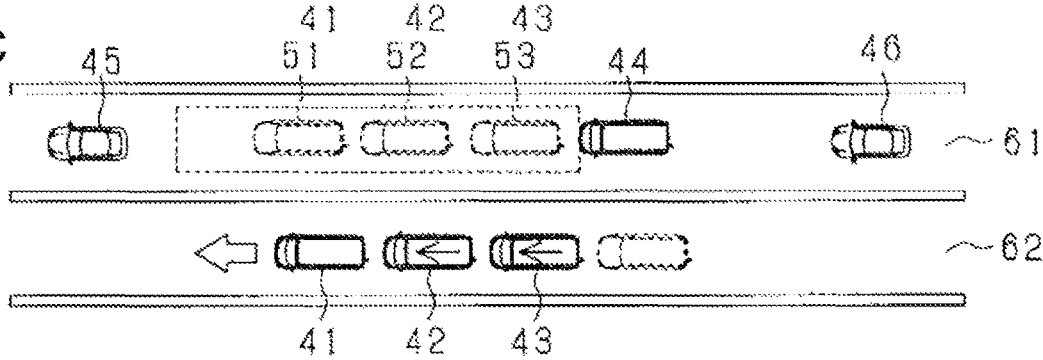
Figure 7D:
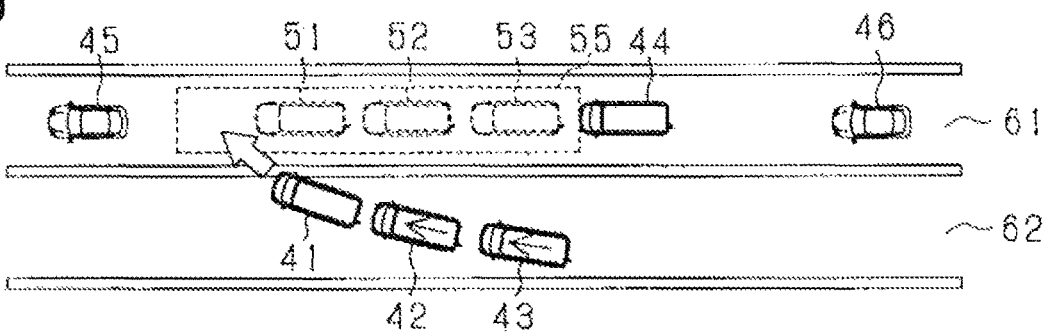
Figure 7E:
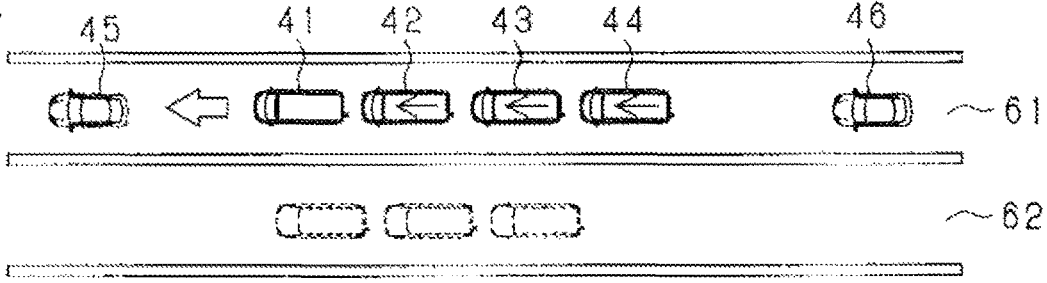

As shown in FIG. 7E, after the head vehicle 41 and the following vehicles 42 and 43 complete changing their lanes, the rearmost vehicle 44 cancels the standby traveling and restarts following the following vehicle 43, which is the lead vehicle of the rearmost vehicle 44.

Figure 8:
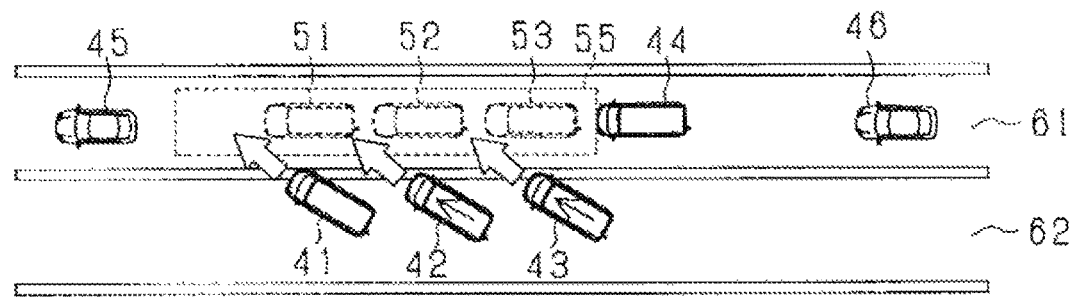
FIG. 8 is a conceptual diagram illustrating a simultaneous lane change in the lane changing (rearmost mode) of the vehicle group during platooning.

Subsequent to FIG. 7C, as shown in FIG. 8, the simultaneous lane change may be executed to synchronize the timings of the lane changing of the head vehicle 41 and the following vehicles 42 and 43. For example, the simultaneous lane change can be achieved by executing the steering for the lane changing of the head vehicle 41 and the following vehicles 42 and 43 in the same phase.

Figure 9A:
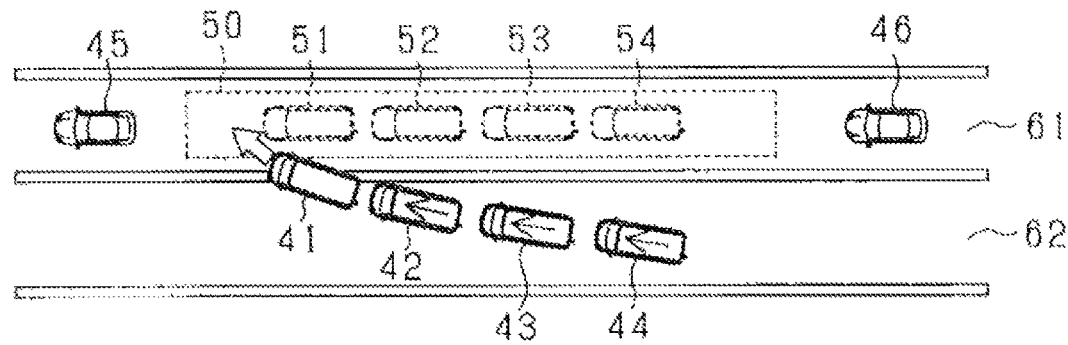
FIGS. 9A and 9B are conceptual diagrams illustrating the progress of the lane changing (head mode) of the vehicle group during platooning.
Figure 9B:
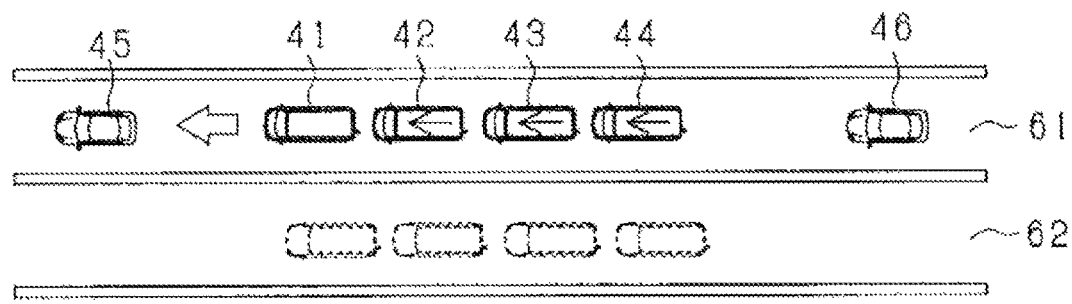

In FIG. 7A, when distance X is greater than the threshold value, the head vehicle 41 changes its lane in the head mode. In the head mode, as shown in FIGS. 9A and 9B, the lane of the entire vehicle group 40 may be changed by steering the head vehicle 41. That is, as shown in FIG. 9A, when the lane changing space 50 is ensured, the driver of the head vehicle 41 performs steering to change its lane from the lane 62 to the lane 61. The following vehicle 42 changes its lane to the lane 62 by following the head vehicle 41. The following vehicle 43 changes its lane to the lane 62 by following the following vehicle 42. The rearmost vehicle 44 changes its lane to the lane 62 by following the following vehicle 43. This completes the lane changing of the vehicle group 40 as shown in FIG. 9B. In the same manner as FIG. 8, the simultaneous lane change may be executed to synchronize the timings of the lane changing of the head vehicle 41, the following vehicles 42 and 43, and the rearmost vehicle 44.

The above-described first embodiment has the following advantages.

The travel assistance ECU 10 is capable of executing lane changing in the rearmost mode in correspondence with the vacant region of a destination lane. That is, after the lane changing of the rearmost vehicle 44 is executed, the lane changing of the head vehicle 41 and the following vehicles 42 and 43 are permitted and executed. By moving the rearmost vehicle 44 to the lane 61, which is the destination lane, prior to changing the lane of the entire vehicle group, the space (lane changing space 50, 55) where the entire vehicle group can move is ensured in the lane 61, which is the destination lane, from the beginning to the end of the lane changing.

During the period from the execution of the lane changing of the rearmost vehicle 44 to the completion of the lane changing of the entire vehicle group, the rearmost vehicle 44 is controlled such that the rearmost vehicle 44 executes the standby traveling to follow the vehicle group in the traveling direction of the vehicle group in the lane 61, which is the destination lane. The standby traveling of the rearmost vehicle 44 ensures the lane changing space 55 in the lane 61, which is the destination lane.

Control is executed for the distance (rearmost distance) between the rearmost vehicle 44 during the standby traveling and the following vehicle 43 in the traveling direction of the vehicle group in FIG. 7C so as to be shorter than the rearmost distance prior to the lane changing instruction of the vehicle group in FIG. 7A. When the rearmost vehicle 44 during the standby traveling in the lane 61 further approaches, in the traveling direction, the following vehicle 43 traveling in the lane 62, an unrelated vehicle is prevented from cutting in front of the rearmost vehicle 44 from the rear of the following vehicle 43.

The lanes of the following vehicles 42 and 43 may be changed by steering for changing the lane of the head vehicle 41. This allows for the execution of the lane changing while keeping the platoon of the head vehicle 41 and the following vehicles 42 and 43.

The steering for changing the lane of the head vehicle 41 is permitted on condition that the lane changing of the rearmost vehicle 44 is completed. Thus, the lanes of the head vehicle 41 and the following vehicles 42 and 43 are changed more safely. Furthermore, after the lane changing of the rearmost vehicle 44 is completed, the lane changing space 55 for the head vehicle 41 and the following vehicles 42 and 43 is reconfirmed. Thus, even if, for example, an unrelated vehicle enters the lane changing space 55, the execution of lane changing is avoided.

At the same time as the steering for changing the lane of the head vehicle 41, the other vehicles (for example, following vehicles 42 and 43) of which the lanes are to be changed may be steered. This simultaneously steers all the vehicles of which the lanes are to be changed, Thus, the lane changing is completed quickly. The lanes may be changed by performing simultaneous steering for all the vehicles when the purpose of lane changing is highly emergent (avoidance for the passage of an emergency vehicle), during traffic congestion, and the like.

The travel assistance ECU 10 permits the lane changing of the vehicle group on condition that the information acquisition unit 101 acquires the vehicle information and surrounding information of each of the vehicles that form the vehicle group and uses the acquired vehicle information and surrounding information to determine that the lane changing of the vehicle group can be executed. When it is determined that the lane changing can be safely executed based on the detection value or the like of the surrounding monitoring sensor 12 of each vehicle, steering for the lane changing is permitted. This limits situations in which the driver erroneously performs steering due to an erroneous determination during the lane changing. Thus, safer traveling can be executed.

In the travel assistance ECU 10, the environment perception unit 102 is capable of perceiving the size of the vacant region of the lane 61, which serves as the destination lane of the vehicle group, based on the vehicle information and surrounding information acquired by the information acquisition unit 101. Further, the platoon control unit 104 selects the execution of the lane changing in the rearmost mode on condition that the size of the vacant region is less than or equal to the predetermined size. When the vacant region includes no margin and the lane changing space may not be able to be ensured for the lane 61, which is the destination lane, from the beginning to the end of the lane changing, the lane changing control is executed in the rearmost mode, which can ensure the lane changing space more reliably. By contrast, when the vacant region includes margins, the execution of the head mode, which quickly completes lane changing with simpler control, is selected. The selection of the mode of lane changing in correspondence with the vacant region allows the lane of the vehicle group to be changed with the safety and rapidity ensured according to various situations.

The following vehicles 42 and 43 and the rearmost vehicle 44 execute lane changing in accordance with, for example, an instruction from the travel assistance ECU 10 installed in the head vehicle 41. This eliminates the need for the travel assistance ECUs 10 installed in the following vehicles 42 and 43 and the rearmost vehicle 44 to determine whether lane changing can be executed or whether lane changing is completed. That is, the following vehicles 42 and 43 and the rearmost vehicle 44 may include an ECU that does not function to determine whether lane changing can be executed or whether lane changing is completed.

Second Embodiment

In the above-described first embodiment, lane changing is executed for a following vehicle and a rearmost vehicle in accordance with a head vehicle. Instead, for example, as shown in FIGS. 10 and 11, in the lane changing control with the rearmost mode, the travel assistance ECU 10 installed in the rearmost vehicle may execute the lane changing control for the rearmost vehicle, and the lane changing control for the rearmost vehicle may be done by the steering performed by the driver of the rearmost vehicle.

Figure 10:
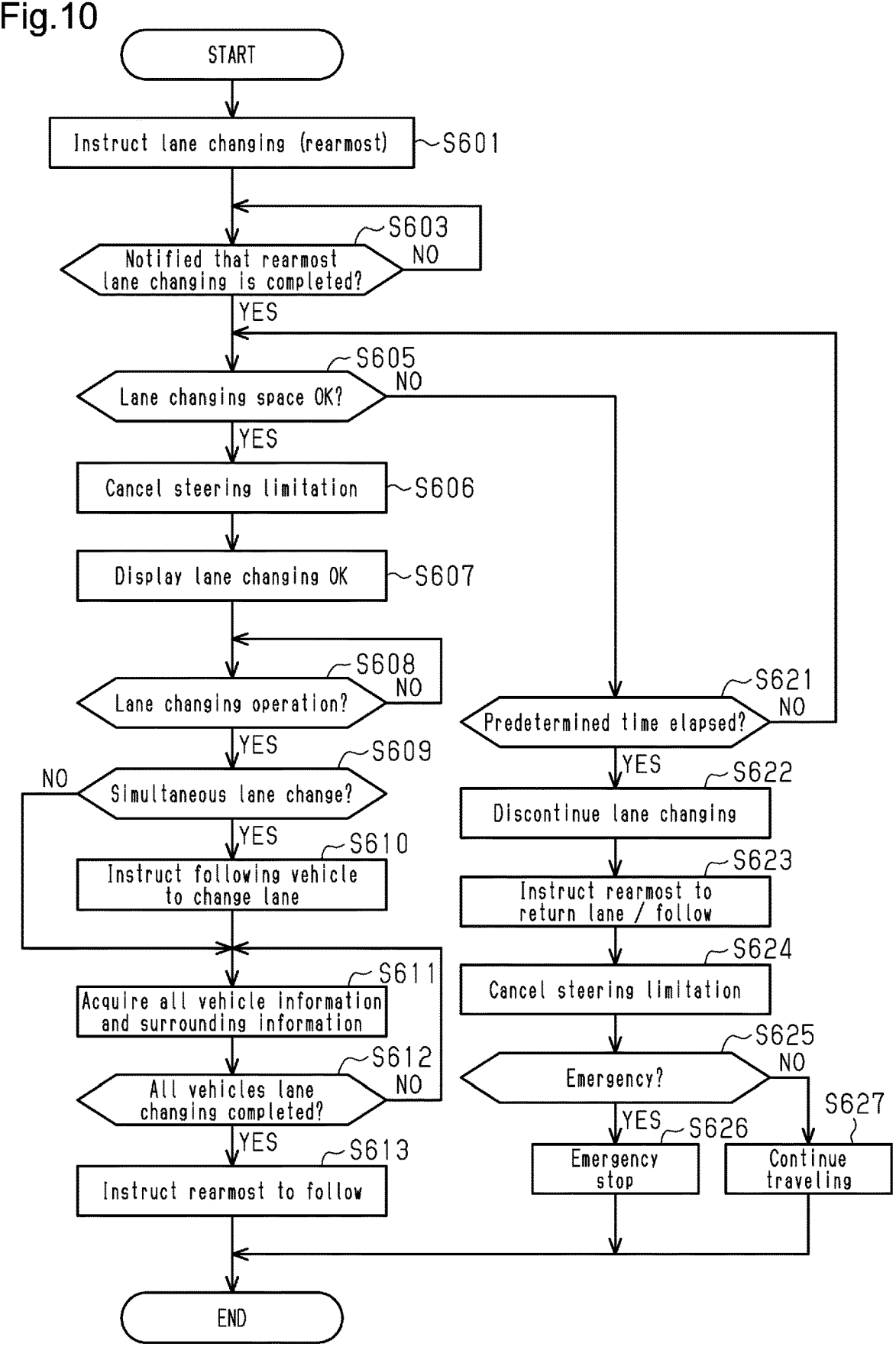
FIG. 10 is a flowchart of the lane changing control (rearmost mode) in the head vehicle.

FIG. 10 shows the flowchart of the lane changing control in the rearmost mode executed by the travel assistance ECU 10 of the head vehicle. The process shown in step S601 corresponds to the process executed by the first control unit. The processes shown in steps S603 to S607 correspond to the processes executed by the second control unit. The processes shown in steps S608 to S610 correspond to the processes executed by the steering adjuster.

First, in step S601, the head vehicle instructs the rearmost vehicle to change the lane and issues a following cancellation instruction of the rearmost vehicle. Then, the process is advanced to step S603. In this step, it is determined whether the notification about a lane changing completion has been issued from the rearmost vehicle.

In step S603, it is determined whether the notification about the lane changing completion of the rearmost vehicle has been issued. When the notification about the lane changing completion has been received from the rearmost vehicle, the process is advanced to step S605. The processes shown in step S605 to step S613 and step S621 to step S627 are the same as the processes shown in step S205 to step S213 and step S221 to step S227, respectively. Thus, the overlapping description is omitted by replacing the numbers from 200 to 209 with the numbers 600 to 609.

FIG. 11 shows the flowchart of e control executed by the travel assistance ECU 10 of the rearmost vehicle. The processes shown in step S712 and S720 correspond to the processes executed by the standby traveling control unit.

First, in step S700, the rearmost vehicle is controlled such that the rearmost vehicle follows the lead vehicle.

In step S701, it is determined whether the lane changing instruction has been received from the head vehicle. When the lane changing instruction has not been issued, the process is ended and the following travel is continued. When the lane changing instruction has been issued, the process is advanced to step S702.

In step S702, it is determined whether the cancellation instruction of the following travel has been received from the head vehicle. When the cancellation instruction of the following travel has not been issued, the process is advanced to step S721. When the cancellation instruction of the following travel has been issued, the process is advanced to step S703.

In step S703, steering of the rearmost vehicle is limited. More specifically, for example, the load on the steering wheel is increased so that the steering of the steering wheel to change the lane is limited. Additionally, when steering is performed, a warning may be presented by the display device 33 or the audio output device 34.

Subsequently, the process is advanced to step S704 to acquire the vehicle information and surrounding information of the rearmost vehicle. Then, the process is advanced to step S705. In step S705, the travel assistance ECU 10 of the rearmost vehicle determines whether the lane changing space for the rearmost vehicle exists. In step S705, the condition may be that the lane changing space exists both in the determination by the travel assist ECU of the rearmost vehicle and the determination by the driver of the rearmost vehicle.

When the lane changing space does not exist, the process is advanced to step S717 to determine whether a predetermined time has elapsed since the lane changing preparation. When the predetermined time has not elapsed, the process is returned to step S704. When the predetermined time has elapsed, the process is advanced to step S718 to transmit the notification saying that the lane of the rearmost vehicle cannot be changed. Then, the process is advanced to step S719. In step S719, the steering limitation of the real most vehicle executed in step S703 is cancelled. Subsequently, the process is ended.

In step S705, when the lane changing space exists, the process is advanced to step S706. In step S706, the steering limitation that has been set in step S703 is cancelled, and the process is advanced to step S707. In step S707, the display device 33, the audio output device 34 of the HMI system 30, or the like notifies the driver of the rearmost vehicle that the lane changing preparation is completed and the lane changing operation can be performed.

Next, the process is advanced to step S708 to determine whether the driver of the rearmost vehicle has performed a steering operation for changing the lane. More specifically, it is determined that the driver of the rearmost vehicle has operated the steering wheel to change the lane to the destination lane.

Subsequently, in step S709, the vehicle information and surrounding information of the rearmost vehicle are acquired. Then, the process is advanced to step S710. In step S710, the acquired vehicle information and surrounding information of the rearmost vehicle are used to determine whether the lane changing of the rearmost vehicle is completed. When the lane changing is not completed, the process is returned to step S709. When the lane changing is completed, the process is advanced to step S711. In step S710, the condition may be that the lane changing is completed both in the determination by the travel assist ECU of the rearmost vehicle and the determination by the driver of the rearmost vehicle.

In step S711, the rearmost vehicle transmits the notification of the lane changing completion of the rearmost vehicle to the head vehicle. Then, the process is advanced to step S712. The processes shown in step S712 to step S715, step S720, and step S721 are the same as the processes shown in step S412 to step S415 and step S420, and step S421, respectively. Thus, the overlapping description is omitted by replacing the numbers from 400 to 409 with the numbers 700 to 709.

The second embodiment has the following advantages.

When changing the lane of the rearmost vehicle in the rearmost mode, the travel assistance ECU 10 installed in the rearmost vehicle uses the acquired vehicle information and surrounding information to determine whether the lane of the rearmost vehicle can be changed. In a case where the head vehicle is distant from the rearmost vehicle because, for example, the number of vehicles forming a vehicle group is large, the travel assistance ECU 10 installed in the rearmost vehicle determines whether the lane of the rearmost vehicle can be changed. This allows the travel assistance ECU 10 to execute lane changing more safely and reliably. Further, since the driver is riding in the rearmost vehicle, the operation performed by the driver for the rearmost vehicle and the determination during lane changing can be executed in an overlapping manner. This allows the travel assistance ECU 10 to execute lane changing more safely and reliably.

For the following vehicle, the travel assist ECU installed in the following vehicle may be configured to determine whether lane changing can be executed and determine whether lane changing is completed. Further, the vehicles forming the vehicle group may be capable of automatically traveling without being operated by the driver. For example, steering for lane changing may be controlled by the travel assist ECU or the vehicle control ECU instead of the driver.

The invention claimed is:

1. A travel assistance device configured to execute a travel assistance for platooning of three or more vehicles that form a vehicle group, the travel assistance device comprising circuitry including:
   a first control unit configured to execute lane changing of a rearmost vehicle when a lane changing instruction for the vehicle group has been issued, the rearmost vehicle being a vehicle located at a rearmost location of the vehicles that form the vehicle group;
   a second control unit configured to permit lane changing of at least one vehicle that forms the vehicle group other than the rearmost vehicle after executing the lane changing of the rearmost vehicle, the three or more vehicles of the vehicle group including the rearmost vehicle, a head vehicle located at a head of the vehicle group, and a following vehicle located between the head vehicle and the rearmost vehicle; and
   a steering adjuster configured to execute the lane changing of the following vehicle in response to steering for the lane changing of the head vehicle.

2. The travel assistance device according to claim 1, wherein:
   standby traveling includes traveling in which the rearmost vehicle follows the vehicle group in a destination lane in a traveling direction of the vehicle group, and
   the circuitry includes a standby traveling control unit configured to cause the rearmost vehicle to execute the standby traveling during a time period from initiating the execution of the lane changing of the rearmost vehicle to completion of the lane changing of an entirety of the vehicle group.

3. The travel assistance device according to claim 2, wherein:
   a distance between the rearmost vehicle during the standby traveling and a lead vehicle in the traveling direction of the vehicle group is a first distance, the lead vehicle being a vehicle of the vehicles forming the vehicle group that is closest to the rearmost vehicle,
   a distance between the rearmost vehicle prior to the lane changing instruction of the vehicle group and the lead vehicle in the traveling direction is a second distance, and
   the standby traveling control unit is configured to cause the rearmost vehicle to execute the standby traveling such that the first distance becomes shorter than the second distance.

4. The travel assistance device according to claim 1, wherein the second control unit is configured to permit the steering adjuster to execute the steering for the lane changing of the head vehicle on condition that the rearmost vehicle has entered a lane changing state.

5. The travel assistance device according to claim 1, wherein the steering adjuster is configured to execute steering for the lane changing of the following vehicle at the same time as executing the steering for the lane changing of the head vehicle.

6. The travel assistance device according to claim 1, wherein the circuitry includes:
   a lane changing unit configured to determine whether lane changing of the vehicle group or lane changing of each of the vehicles that form the vehicle group is executable based on vehicle information and surrounding information related to the vehicles that form the vehicle group; and
   a platoon control unit configured to permit the lane changing of each of the vehicles that form the vehicle group on condition that the lane changing unit has determined that the lane changing of the vehicles that form the vehicle group is executable.

7. A travel assistance device configured to execute a travel assistance for platooning of three or more vehicles that form a vehicle group, the travel assistance device comprising circuitry including:

an environment perception unit configured to perceive a size of a vacant region of a lane based on vehicle information and surrounding information related to the vehicles that form the vehicle group, the lane serving as a destination lane of the vehicle group, the three or more vehicles of the vehicle group including a head vehicle located at a head of the vehicle group, a rearmost vehicle located at a rearmost location of the vehicles of the vehicle group, and a following vehicle located between the head vehicle and the rearmost vehicle;

a steering adjuster configured to execute the lane changing of the following vehicle in response to steering for the lane changing of the head vehicle;

a platoon control unit configured to select a rearmost mode on condition that the size of the vacant region is less than or equal to a predetermined size and select a head mode on condition that the size of the vacant region is greater than the predetermined size, wherein:

the rearmost mode is a mode of executing the lane changing of at least one vehicle that forms the vehicle group other than the rearmost vehicle after executing lane changing of the rearmost vehicle, and the head mode is a mode of executing the lane changing of the vehicles that form the vehicle group in response to the lane changing of the head vehicle.

* * * * *